United States Patent
Redi

(10) Patent No.: US 8,145,201 B2
(45) Date of Patent: Mar. 27, 2012

(54) METHODS AND APPARATUS FOR REDUCED ENERGY COMMUNICATION IN AN AD HOC NETWORK

(75) Inventor: Jason Keith Redi, Belmont, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 821 days.

(21) Appl. No.: 11/439,320

(22) Filed: May 22, 2006

(65) Prior Publication Data

US 2006/0229083 A1    Oct. 12, 2006

Related U.S. Application Data

(63) Continuation-in-part of application No. 11/078,257, filed on Mar. 10, 2005, now Pat. No. 7,330,736.

(60) Provisional application No. 60/637,198, filed on Dec. 17, 2004.

(51) Int. Cl.
| | |
|---|---|
| *H04M 3/00* | (2006.01) |
| *H04W 72/00* | (2009.01) |
| *H04W 4/00* | (2009.01) |
| *H04B 7/00* | (2006.01) |
| *H04B 1/16* | (2006.01) |
| *H04B 7/185* | (2006.01) |
| *H04J 3/00* | (2006.01) |

(52) U.S. Cl. ....... 455/420; 455/453; 455/41.2; 455/522; 455/343.3; 370/338; 370/345; 370/318

(58) Field of Classification Search .............. 370/338
See application file for complete search history.

(56) References Cited

U.S. PATENT DOCUMENTS

| | | | |
|---|---|---|---|
| 4,964,121 | A | 10/1990 | Moore |
| 5,128,938 | A | 7/1992 | Borras |
| 5,203,020 | A | 4/1993 | Sato et al. |
| 5,301,225 | A | 4/1994 | Suzuki et al. |
| 5,418,539 | A | 5/1995 | Sezai et al. |
| 5,430,731 | A | 7/1995 | Umemoto et al. |
| 5,590,396 | A | 12/1996 | Henry |
| 5,649,108 | A | 7/1997 | Spiegel et al. |
| 5,710,975 | A | 1/1998 | Bernhardt et al. |
| 5,754,790 | A | 5/1998 | France et al. |
| 5,987,024 | A | 11/1999 | Duch et al. |
| 6,016,322 | A | 1/2000 | Goldman |
| 6,028,853 | A | 2/2000 | Haartsen |
| 6,058,106 | A | 5/2000 | Cudak et al. |
| 6,097,957 | A | 8/2000 | Bonta et al. |

(Continued)

OTHER PUBLICATIONS

Tjoa R et al: "Clock drift reduction for relative time slot TDMA-based sensor networks" (Sep. 5, 2004) PIMRC 2004, IEEE, pp. 1042-1047.

(Continued)

*Primary Examiner* — George Eng
*Assistant Examiner* — Muthuswamy Manoharan
(74) *Attorney, Agent, or Firm* — Ropes & Gray LLP

(57) ABSTRACT

The invention relates to communications devices for reduced energy communications in an ad hoc network. The communication device includes a first low-powered transceiver for initiating communications with other communications devices and a second transceiver for transmitting data messages to the other communications devices once communication is initiated. The communication device also includes a communications control processor for determining times at which the other communications devices will be available to receive communications based on scheduling data received from those communication devices. The communications control processor can also take into account requests for reserved bandwidth.

27 Claims, 8 Drawing Sheets

U.S. PATENT DOCUMENTS

| | | |
|---|---|---|
| 6,104,708 A | 8/2000 | Bergamo |
| 6,118,769 A | 9/2000 | Pries et al. |
| 6,127,799 A | 10/2000 | Krishnan |
| 6,188,911 B1 | 2/2001 | Wallentin et al. |
| 6,243,579 B1 | 6/2001 | Kari et al. |
| 6,262,684 B1 | 7/2001 | Stewart et al. |
| 6,304,215 B1 | 10/2001 | Proctor et al. |
| 6,359,901 B1 | 3/2002 | Todd et al. |
| 6,374,311 B1 | 4/2002 | Mahany et al. |
| 6,377,211 B1 | 4/2002 | Hsiung |
| 6,400,317 B2 | 6/2002 | Rouphael et al. |
| 6,404,386 B1 | 6/2002 | Proctor et al. |
| 6,418,148 B1 | 7/2002 | Kumar et al. |
| 6,463,307 B1 | 10/2002 | Larsson et al. |
| 6,476,773 B2 | 11/2002 | Palmer et al. |
| 6,477,361 B1 | 11/2002 | LaGrotta et al. |
| 6,490,461 B1 | 12/2002 | Muller |
| 6,498,939 B1 | 12/2002 | Thomas |
| 6,512,935 B1 | 1/2003 | Redi |
| 6,583,675 B2 | 6/2003 | Gomez |
| 6,583,685 B1 | 6/2003 | Easter et al. |
| 6,598,034 B1 | 7/2003 | Kloth |
| 6,601,093 B1 * | 7/2003 | Peters ............ 709/220 |
| 6,611,231 B2 | 8/2003 | Crilly et al. |
| 6,611,233 B2 | 8/2003 | Kimura |
| 6,671,525 B2 | 12/2003 | Allen et al. |
| 6,714,983 B1 | 3/2004 | Koenck et al. |
| 6,721,275 B1 | 4/2004 | Rodeheffer et al. |
| 6,735,178 B1 | 5/2004 | Srivastava et al. |
| 6,735,630 B1 | 5/2004 | Gelvin et al. |
| 6,745,027 B2 | 6/2004 | Twitchell |
| 6,757,248 B1 | 6/2004 | Li et al. |
| 6,791,949 B1 | 9/2004 | Ryu et al. |
| 6,804,208 B2 | 10/2004 | Cain et al. |
| 6,816,115 B1 | 11/2004 | Redi |
| 6,859,135 B1 | 2/2005 | Elliott |
| 6,888,819 B1 | 5/2005 | Mushkin et al. |
| 6,894,975 B1 | 5/2005 | Partyka |
| 6,894,991 B2 | 5/2005 | Ayyagari et al. |
| 6,920,123 B1 | 7/2005 | Shin et al. |
| 6,973,039 B2 | 12/2005 | Redi et al. |
| 6,981,052 B1 | 12/2005 | Cheriton |
| 6,990,075 B2 | 1/2006 | Krishnamurthy et al. |
| 7,020,501 B1 | 3/2006 | Elliott et al. |
| 7,020,701 B1 | 3/2006 | Gelvin et al. |
| 7,027,392 B2 | 4/2006 | Holtzman et al. |
| 7,046,639 B2 | 5/2006 | Garcia-Luna-Aceves et al. |
| 7,058,031 B2 | 6/2006 | Bender et al. |
| 7,072,432 B2 | 7/2006 | Belcea |
| 7,088,678 B1 | 8/2006 | Freed et al. |
| 7,103,344 B2 | 9/2006 | Menard |
| 7,110,783 B2 | 9/2006 | Bahl et al. |
| 7,133,398 B2 | 11/2006 | Allen et al. |
| 7,142,520 B1 | 11/2006 | Haverinen et al. |
| 7,142,864 B2 | 11/2006 | Laroia et al. |
| 7,151,945 B2 | 12/2006 | Myles et al. |
| 7,155,263 B1 | 12/2006 | Bergamo |
| 7,165,102 B2 | 1/2007 | Shah et al. |
| 7,184,413 B2 | 2/2007 | Beyer et al. |
| 7,209,771 B2 | 4/2007 | Twitchell, Jr. |
| 7,218,630 B1 | 5/2007 | Rahman |
| 7,286,844 B1 | 10/2007 | Redi et al. |
| 7,330,736 B2 | 2/2008 | Redi |
| 7,342,876 B2 | 3/2008 | Bellur et al. |
| 7,346,679 B2 | 3/2008 | Padmanabhan et al. |
| 7,349,370 B2 | 3/2008 | Lee et al. |
| 7,363,371 B2 | 4/2008 | Kirkby et al. |
| 7,369,512 B1 | 5/2008 | Shurbanov et al. |
| 7,376,827 B1 | 5/2008 | Jiao |
| 7,388,847 B2 | 6/2008 | Dubuc et al. |
| 7,466,655 B1 | 12/2008 | Zhao |
| 7,489,635 B2 | 2/2009 | Evans et al. |
| 7,523,220 B2 | 4/2009 | Tan et al. |
| 7,583,654 B2 | 9/2009 | Zumsteg |
| 7,599,443 B2 | 10/2009 | Ionescu et al. |
| 7,664,055 B2 | 2/2010 | Nelson |
| 7,668,127 B2 | 2/2010 | Krishnamurthy et al. |
| 7,688,772 B2 | 3/2010 | Sinivaara et al. |
| 7,719,989 B2 | 5/2010 | Yau |
| 7,742,399 B2 | 6/2010 | Pun |
| 7,764,617 B2 | 7/2010 | Cain et al. |
| 7,881,202 B2 | 2/2011 | Lansing et al. |
| 2002/0071395 A1 | 6/2002 | Redi et al. |
| 2002/0145978 A1 | 10/2002 | Batsell et al. |
| 2002/0146985 A1 | 10/2002 | Naden |
| 2002/0147816 A1 | 10/2002 | Hlasny |
| 2002/0186167 A1 | 12/2002 | Anderson |
| 2003/0037167 A1 | 2/2003 | Garcia-Luna-Aceves et al. |
| 2003/0067892 A1 | 4/2003 | Beyer et al. |
| 2003/0099210 A1 | 5/2003 | O'Toole et al. |
| 2003/0114204 A1 | 6/2003 | Allen et al. |
| 2003/0115369 A1 | 6/2003 | Walter et al. |
| 2003/0152110 A1 | 8/2003 | Rune |
| 2003/0179742 A1 | 9/2003 | Ogier et al. |
| 2003/0185170 A1 | 10/2003 | Allen et al. |
| 2003/0202490 A1 * | 10/2003 | Gunnarsson et al. ......... 370/332 |
| 2003/0222819 A1 | 12/2003 | Karr et al. |
| 2004/0077353 A1 | 4/2004 | Mahany |
| 2004/0125773 A1 | 7/2004 | Wilson et al. |
| 2004/0176023 A1 | 9/2004 | Linder et al. |
| 2005/0009578 A1 | 1/2005 | Liu |
| 2005/0059347 A1 | 3/2005 | Haartsen |
| 2005/0124313 A1 * | 6/2005 | Simpson et al. ........... 455/343.3 |
| 2005/0134403 A1 | 6/2005 | Kajiya |
| 2005/0135379 A1 | 6/2005 | Callaway et al. |
| 2005/0152329 A1 * | 7/2005 | Krishnan et al. .............. 370/345 |
| 2005/0176468 A1 * | 8/2005 | Iacono et al. .............. 455/562.1 |
| 2005/0185632 A1 | 8/2005 | Draves, Jr. et al. |
| 2005/0207376 A1 | 9/2005 | Ashwood-Smith et al. |
| 2005/0215196 A1 * | 9/2005 | Krishnan et al. ............. 455/41.2 |
| 2006/0007865 A1 | 1/2006 | White et al. |
| 2006/0010249 A1 | 1/2006 | Sabesan et al. |
| 2006/0013160 A1 | 1/2006 | Haartsen |
| 2006/0047807 A1 | 3/2006 | Magnaghi et al. |
| 2006/0058102 A1 * | 3/2006 | Nguyen et al. .................. 463/39 |
| 2006/0068837 A1 | 3/2006 | Malone |
| 2006/0126514 A1 | 6/2006 | Lee et al. |
| 2006/0135145 A1 | 6/2006 | Redi |
| 2006/0215583 A1 | 9/2006 | Castagnoli |
| 2006/0227724 A1 | 10/2006 | Thubert et al. |
| 2006/0229083 A1 | 10/2006 | Redi |
| 2007/0070983 A1 | 3/2007 | Redi et al. |
| 2007/0110000 A1 | 5/2007 | Abedi |
| 2007/0149204 A1 | 6/2007 | Redi et al. |
| 2007/0153731 A1 | 7/2007 | Fine |
| 2008/0049620 A1 | 2/2008 | Riga et al. |
| 2008/0232258 A1 | 9/2008 | Larsson et al. |
| 2008/0232344 A1 | 9/2008 | Basu et al. |
| 2009/0103461 A1 | 4/2009 | Tan et al. |
| 2009/0129316 A1 | 5/2009 | Ramanathan et al. |
| 2009/0161641 A1 * | 6/2009 | Kim ............................ 370/338 |

OTHER PUBLICATIONS

Dai H et al: "Tsync: A Lightweight Bidirectional Time Synchronization Service for Wireless Sensor Networks" (Jan. 2004), Mobile Computing and Communications Review, ACM, NY, pp. 125-139, ISSN: 1091-1669.

Ebner A et al: "Decentralized slot synchronization in highly dynamic ad hoc networks" Wireless Personal Mutlimedia Communications, 2002, IEEE, vol. 2, (Oct. 27, 2002).

Zhijun Shang et al: "A low overhead multi-hop time sync protocol for wireless sensor networks" Networking, Sensing and Control, 2005, IEEE (Mar. 19, 2005), pp. 54-59.

Singh S et al "Power-Aware Routing in Mobile Ad Hoc Networks" Mobicom '98, Proceedings of the 4th Annual ACM/IEEE International Conference on Mobile Computing and Networking, Dallas, TX (Oct. 25-30, 1998) XP000850267, pp. 181-190.

Fan Ye et al "A randomized energy-conservation protocol for resilient sensor networks*" Wireless Networks; The Journal of Mobile Communication, Computation and Information, Kluwer Academic Publishers, Do, vol. 12, No. 5, (Apr. 27, 2006) pp. 637-652.

Office Action dated Apr. 3, 2008, U.S. Appl. No. 10/786,288.

U.S. Appl. No. 10/786,288, Elliott.

U.S. Appl. No. 10/677,945, Redi.

U.S. Appl. No. 11/895,608, Riga et al.

Hong et al. "Scalable Routing Protocols for Mobile Ad Hoc Networks," IEEE Network; pp. 11-21. (Jul./Aug. 2002).

Lang, "A Comprehensive Overview about Selected Ad Hoc Networking Routing Protocols," (2003).

Halvardsson et al, "Reliable Group Communication in a Military Mobile Ad Hoc Network," Vaxjo University School of Mathematics and Systems Engineering, Report # 04006, pp. 1-52 (2004).

Wieselthier et al, "On the Construction of Energy-Efficient Broadcast and Multicast Tress in Wireless Networks," IEE Infocom 2000, p. 585-94 (2000).

Ruppe et al, "Near Term Digital Radio (NTDR) System," IE, pp. 1282-1287 (1997).

Ogier et al, "Topology Dissemination Based on Reverse-Path Forwarding (TBRPF)," Sunsite.dk, Technical Memo, RFC 3684, The Internet Society), pp. 1-49 (2004.

Clausen, et al, "Optimized Link State Routing Protocol (OLSR)," Technical Memo, RFC 3626, The Internet Society, pp. 1-6 (2003).

Sichitiu et al, "Simple, Accurate Time Synchronization for Wireless Sensor Networks," Proc. IEEE, WCNC pp. 1266-1273 (2003).

Mills, David L., "Internet Time Synchronization: The Network Time Protocol," IEEE Transactions on Communications, 39:10; pp. 1482-1492. (1991).

Ganeriwal et al, "Timing-sync Protocol for Sensor Networks," Proc. ACM SenSys (2003).

Ebner et al, "Synchronization in Ad Hoc Networks Based on UTRA TDD" (2003).

Li et al., Global Clock Synchronization in Sensor Networks, Proc. IEEE Infocom (2004).

Maroti et al., "The Flooding Time Synchronization Protocol," Proc. ACM Sensys. (2004).

Elson et al., "Fine-Grained Network Time Synchronization using Reference Broadcasts," Proc. USENIX OSDI, pp. 147-163 (2002).

Werner-Allen et al, "Firefly-Inspired Sensor Network Synchronicity with Realistic Radio Effects," Proc. ACM Sensys, pp. 142-153 (2005).

Office Action dated Sep. 8, 2006, U.S. Appl. No. 10/786,288.

Office Action dated Mar. 30, 2007, U.S. Appl. No. 10/786,288.

Office Action dated Sep. 25, 2007, U.S. Appl. No. 10/786,288.

Office Action dated Jun. 15, 2007, U.S. Appl. No. 10/677,945.

Office Action dated May 7, 2007, U.S. Appl. No. 11/078,257.

Office Action dated Dec. 12, 2007, U.S. Appl. No. 10/677,945.

Florens, C. et al., "Scheduling Algorithms for Wireless Ad-Hoc Sensor Networks", *Global Telecommunications Conference, GLOBECOM '02 IEEE*, vol. 1., pp. 6-10 (2002).

Huang, Z. et al., "A Busy-Tone Based Directional MAC Protocol for Ad Hoc Networks", *MILCOM 2002. Proceedings, IEEE*, vol. 2. pp. 1233-38 (2002).

Huang, Z. et al., "A Comparison Study of Omnidirectional and Directional MAC Protocols for Ad Hoc Networks". *Global Telecommunications Conference, GLOBECOM '02, IEEE*, vol. 1, pp. 57-61 (2002).

Ko, Y.B. et al., "Medium Access Control Protocols Using Directional Antennas in Ad Hoc Networks", *INFOCOM 19th Annual Joint Conference of the IEEE Computer and Communications Societies, IEEE*, vol. 1, pp. 13-21 (2000).

Mauve, M. et al., "A Survey on Position-Based Routing in Mobile Ad Hoc Networks", *IEEE Network*, vol. 15:6, pp. 30-39 (2001).

Nasipuri, A. et al. "A MAC Protocol for Mobile Ad Hoc Networks Using Directional Antennas", *Wireless Communications and Networking Conference 2000. WCNC. 2000 IEEE*, vol. 3: pp. 1214-19 (2000).

XE-1218—Single Chip Receiver; XEMICS; 8 pages (2001).

Office Action dated Dec. 9, 2008, U.S. Appl. No. 11/347,963.

Office Action dated Sep. 16, 2009, U.S. Appl. No. 11/347,963.

Shurbanov et al., "Energy-Efficient Flooding in Mobile Ad-Hoc Networks", Proceedings of 23rd Annual Army Science Conference, Orlando, FL, 2 pages (2002).

Office Action dated Mar. 15, 2010, U.S. Appl. No. 12/229,039.

Office Action dated Jul. 2, 2010, U.S. Appl. No. 11/895,527.

Office Action dated Jul. 20, 2010 U.S. Appl. No. 11/656,767.

Office Action dated Aug. 3, 2010 U.S. Appl. No. 11/895,608.

Office Action dated Feb. 18, 2011 U.S. Appl. No. 12/229,039.

Office Action dated Jan. 13, 2011 U.S. Appl. No. 11/895,527.

Office Action dated Jan. 7, 2011 U.S. Appl. No. 11/656,767.

\* cited by examiner

METHODS AND APPARATUS FOR REDUCED ENERGY COMMUNICATION IN AN AD HOC NETWORK

CROSS REFERENCE TO RELATED APPLICATIONS

This application is a continuation-in-part of U.S. patent application Ser. No. 11/078257, filed Mar. 10, 2005, which claims the benefit of priority of U.S. Provisional Application No. 60/637,198 filed Dec. 17, 2004, the disclosures of which are incorporated herein by reference in their entirety.

GOVERNMENT SUPPORT

Work described herein was funded, in part, by the Department of the Interior, Fort Huachuca, Ariz., Contract Number NBCHC030087. The United States government has certain rights in the invention.

FIELD OF THE INVENTION

The invention relates to communication devices and methods of use thereof in ad hoc networks that operate with reduced energy consumption.

BACKGROUND

Ad hoc networks include a plurality of nodes, many of which are mobile, in wireless communication with one another. The topology of ad hoc networks varies as the nodes move with respect to each other, coming in and out of range of each others' transmitters. Typically, nodes in ad hoc networks schedule their communications with each other using various time division and/or frequency division multiplexing schemes.

In practice, a communication device using a periodic TDMA communications protocol remains in one of two states, transmit or receive. To remain in either state, the communication device supplies power to a transceiver. For many communication devices, the device is predominantly idle, waiting in a powered receive state in case an incoming message arrives. A deficiency of this approach is that in low network traffic environments, the amount of energy used in an idle receive state dominates the total energy used by the communication device.

SUMMARY

The invention addresses the deficiencies in the prior art by providing, in various aspects, systems, methods, and devices relating to limiting the time that the communication devices spend in a powered receive state. According to one embodiment, a first communication device includes at least one transceiver and a communications control processor. The communications control processor receives scheduling data from a second communication device. The scheduling data enables the first communication to predict a time at which the second communication device will be available to receive communications. The communications control processor causes the transceiver to transmit a communication to the second communication device at the predicted time.

According to another embodiment, the second communication device also includes at least one transceiver and a communications control processor. The communication control processor of the second communication device determines the times at which the second communication device will turn on its transceiver to await receipt of messages. Thus, with both the first and second communication devices, unless their respective communications control processors determine that the second communication device is scheduled to be available to receive a message, they can both power-down their transceivers to conserve energy.

In a further embodiment, the scheduling data sent by the second communication device to the first communication device includes a seed datum, a cycle state, and at least one availability threshold. Availability thresholds include unicast and multicast thresholds for indicating the availability of the second communication device to receive unicast and multicast messages, respectively. As used herein, multicasting refers to multicasting, broadcasting, or group multicasting. A feature of the invention includes the ability for the communications control processor of the second communication device to dynamically alter its thresholds in response to changes in the network environment. For example, the second communication device may change its thresholds in response to a change in the level of traffic on the network, or in response to detecting a change in the network topology.

According to a further embodiment, both the first and second communication devices utilize two transceivers, a higher-powered transceiver and a low-powered transceiver. The lower-powered transceivers of the communication devices transmit and receive communication initiation messages, which indicate the imminent transmission of a data message. The higher-powered transceivers of the communication devices transmit and receive data messages. Additional features include the communication devices transmitting and/or receiving initiation acknowledgement messages to confirm availability for receiving data, and data acknowledgement messages to confirm successful receipt of data messages.

According to another embodiment, the communications processor of the first communication device employs a pseudorandom number generator to predict when the second communication device will be available for receiving communications. Similarly, the communications processor of the second communication device also uses a pseudo-random number generator to determine when it will be available to receive communications. According to one implementation, the scheduling data includes a seed datum, a cycle state, and one or more availability thresholds, and the processor of the first communication device compares the output of the pseudorandom number generator to the one or more availability thresholds. One feature of the invention includes the ability of the receiving communication device to dynamically alter its availability thresholds based on changes to levels of network traffic and/or changes in network topology.

At the predicted time, the first communication device powers up its lower-powered transceiver and transmits a communication initiation message to the second communication device. Similarly, the lower-powered transceiver of the second communication device is powered up to await receipt of a communication initiation message from the first communication device. If the low-powered transceiver of the second communication device receives a communication initiation message, it powers up its higher-powered transceiver to receive an incoming data communication. Otherwise, it powers down its transceivers and awaits a subsequent time in which it is available to receive data messages. Subsequent to sending the communication message, the first communication device powers up its higher-powered transceiver and transmits the data communication to the second communication device.

In some embodiments, the first communication device waits for a confirmation from the second communication device that its higher-powered transceiver is ready prior to sending the data communication. Also, it should be noted that data communications may be sent from the second communication device to the first communication device using the same protocol.

BRIEF DESCRIPTION OF THE DRAWINGS

The invention may be better understood from the following illustrative description with reference to the following drawings.

DESCRIPTION OF AN ILLUSTRATIVE EMBODIMENT

One class of protocols often used in an ad hoc networking environment is a Time Division Multiple Access (TDMA) Multiplexing Media-Access Control (MAC) layer protocol. In a TDMA communications protocol, time is divided into a number of time slots, and multiple users of a communications channel are assigned different time slots in which they can transmit communications. Typically, the time slots are allotted among the communication devices on the channel in a periodic fashion. In practice, a communication device using a periodic TDMA communications protocol remains in one of two states, transmit or receive. To remain in either state, the communication device supplies power to a transceiver. A powered state is referred to hereinafter alternatively as "powered" or "awake." The process of transitioning into a powered state is referred to alternatively as "powering up" or "waking up." For many communication devices, the device is predominantly idle, waiting in a powered state to receive an incoming message in case one arrives. In low network traffic environments, the amount of energy used in an idle receive state dominates the total energy used by the communication device.

A communication device can conserve power by limiting the time it spends in a powered receive state. The invention, in various illustrative embodiments, limits the time devices spend in the powered receive state. According to one approach, the invention establishes a schedule of when the communication device is available to receive messages. Unless scheduled to be available, the communication device can power-down its transceiver. To improve efficiency, a communication device may provide other devices on a network with information from which the other devices can determine the communication device's availability schedule.

Figure 1:
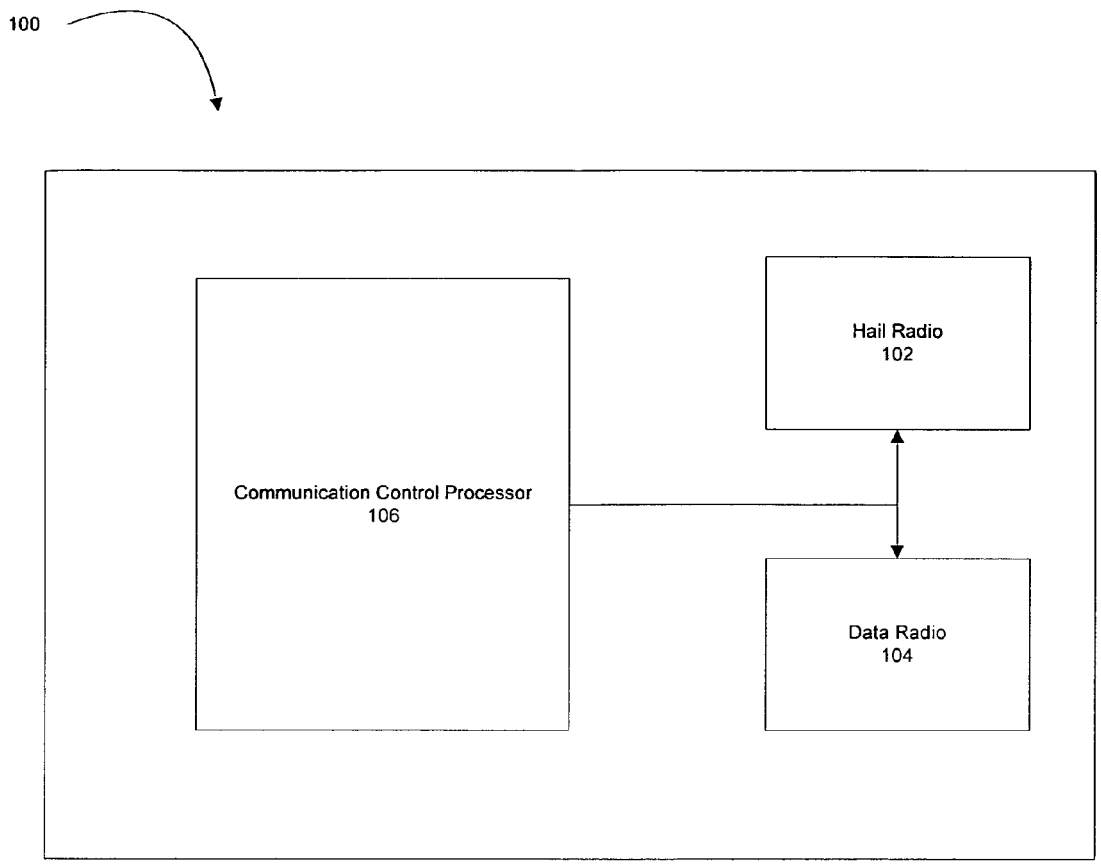
FIG. 1 is a conceptual block diagram of a communication device for reduced energy wireless communication according to an illustrative embodiment of the invention.

FIG. 1 is a conceptual block diagram of a communication device 100 for reduced energy wireless communication according to an illustrative embodiment of the invention. The communication device 100 includes two transceivers 102 and 104 and a communications control processor 106.

One transceiver 102 is a hail radio used for transmitting communication initiation messages (such as indicated at 205 in FIG. 2) to other devices indicating that a data message from the communication device 100 is forthcoming, and for receiving similar messages from other communication devices. The hail radio 102 transmits and receives messages at a relatively low data rate, for example, at tens of kilobits per second (kbs). Low data rate transceivers require less precision to operate than higher data rate transceivers and therefore, operates using less power.

In the illustrative embodiment, the communication device 100 utilizes a ChipCon CC1010 chipset, provided by Chipcon AS of Oslo Norway, for the hail radio 102. The ChipCon CC1010 uses 150 mW to transmit, 30 mW in receipt mode, and 0.3 mW in standby mode. The ChipCon CC1010 can transmit at data rates ranging from 600-76,000 bps. Other suitable hail radios include, without limitation, the Micrel MICRF501 and the Micrel MICRF500, provided by Micrel Semiconductor Corporation of San Jose, Calif.

The other transceiver 104 is a data radio for transmitting the data messages announced by the hail radio 102. The data radio 104 transmits and receives data messages at a data rate that is higher than the data rate used by the hail radio 102. As a result, the second transceiver uses more power. The illustrative communication device 100 uses a standard 802.11b transceiver for its data radio 104. Such transceivers use about 1.2 W to transmit data, about 900 mW while actively receiving data, and 850 mW while awaiting receipt of a data, and about 10 mW when asleep. The data radio 104 can transmit at data rates ranging from about 1-11 Mbps.

The communications control processor 106 in the illustrative communication device 100 controls the receipt and transmission of communications and also regulates the scheduling thereof. A central processing unit of a general purpose computer running specialized communications software serves as the communications control processor 106 of the illustrative communication device 100. In other implementations, the communications control processor 106 may be implemented using one or a combination of a general or special purpose computer, software, and analog or digital integrated circuits, including, without limitation, application specific integrated circuits (ASICs) and digital signal processors (DSPs). The communications control processor 106 utilizes a modified TDMA multiplexing scheme to control transmission and reception of communications. In the modified TDMA multiplexing scheme of the invention, time slots are further subdivided into a number of time mini-slots.

Figure 2:
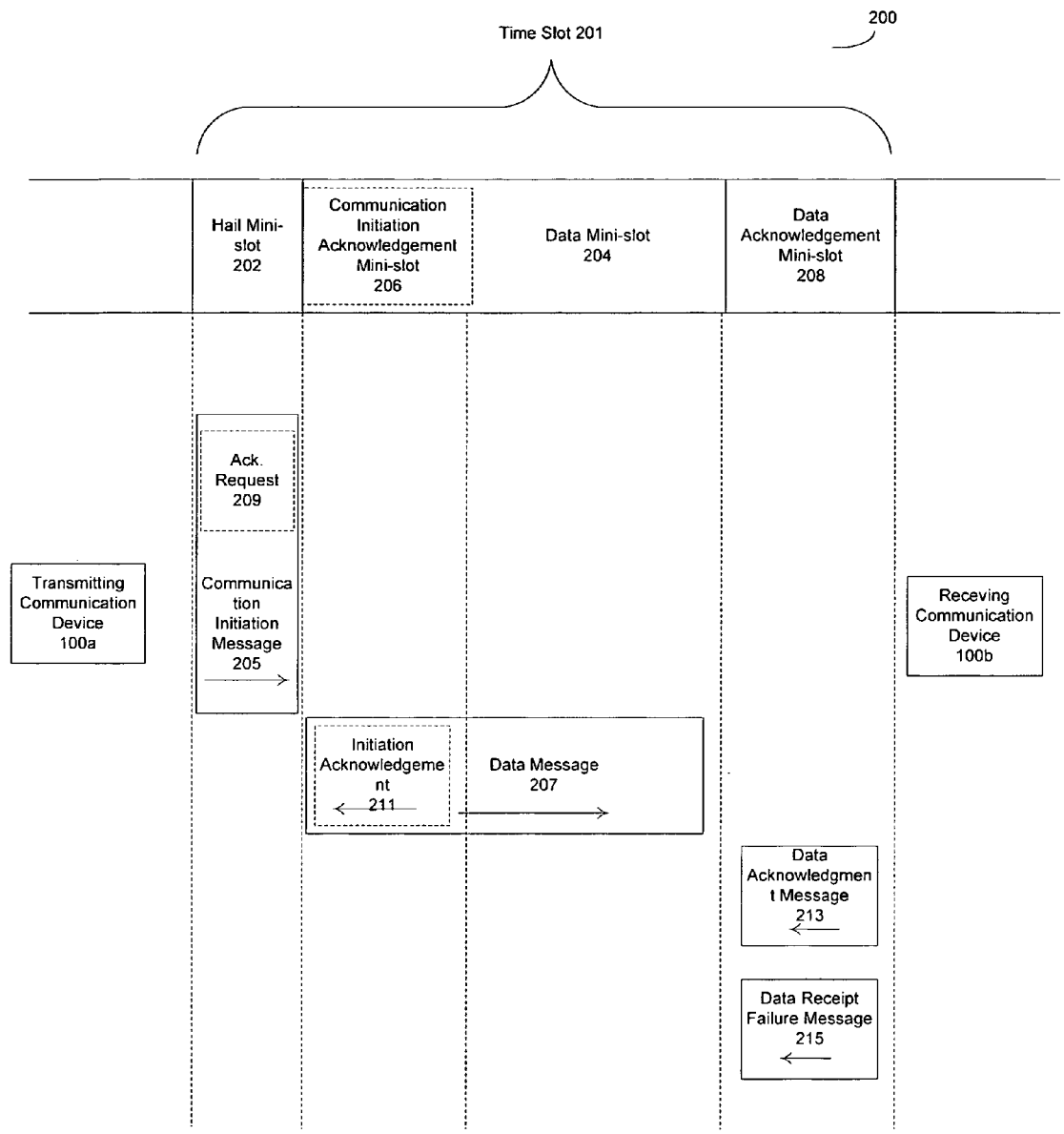
FIG. 2 is a conceptual diagram of an exemplary transmission and time allocation scheme within a scheduled time slot employed with the illustrative embodiment of the invention of FIG. 1.

FIG. 2 is a conceptual diagram of an exemplary transmission and time allocation scheme 200 for use within a scheduled time slot 201 employed with the illustrative embodiment of the invention of FIG. 1. The conceptual diagram of the time allocation scheme 200 for the time slot 201 is located at the top of FIG. 2. Below the diagram of the time slot 201, FIG. 2 includes a conceptual diagram of a series of messages representing the transmission scheme 200. Each message corresponds to the portion of the time slot 201 beneath which it is illustrated. Beneath each message, an arrow indicates the direction of the message. An arrow pointing to the right indicates a message sent by a transmitting communication device 100a, and an arrow pointing to the left indicates a message sent by a receiving communication device 100b. Although this need not be the case, for illustrative purposes the devices 100a and 100b are both substantially identical to the communication device 100 of FIG. 1. Accordingly, like reference numerals appended with an "a" or "b" are used when referring to the components of the devices 102a and 102b.

Referring now to FIGS. 1 and 2, the illustrative time slot 201 includes at least a hail mini-slot 202 and a data mini-slot 204. The data mini-slot 204 is preferably longer than the hail mini-slot 202. During the hail mini-slot 202, if a transmitting communication device 100a has a queued message to send to a receiving communication device 100b that is available for receiving a communication, the hail radio 102a of the transmitting communications device 100a transmits a communication initiation message 205 to the receiving communication device 100b. If the receiving communication device 100b is scheduled to be available for receiving messages during a given time slot 201, the receiving communication device 100b has its hail radio 102b powered up and is awaiting receipt of a communication initiation message, such as the message 205. Preferably, the data radio 104b is powered down during the hail mini-slot 202.

The data mini-slot 204 is used for transmitting and receiving data messages 207. If a transmitting communication device 100a transmits a communication initiation message 205 during the hail mini-slot 202, the transmitting communication device 100a wakes up its data radio 104 and transmits a data message 207 to the receiving communication device 100b during the data mini-slot 204.

In the case of a receiving communication device 100b that is scheduled to be available for receiving messages during a time slot 201, its activity during the data mini-slot 204 depends upon whether it receives a communication initiation message 205 during the hail mini-slot 202. If the receiving communication device 100b receives a communication initiation message 205 during the hail mini-slot 202, it powers down its hail radio 102b and wakes up its data radio 104b to await receipt of a data message 207 in the data mini-slot 204. If the receiving communication device 100b does not receive a communication initiation message 205 during the hail mini-slot 202, the receiving communication device 100b powers down its hail radio 102b and awaits its next scheduled receive time. The data radio 104b remains powered down to conserve power as no message is expected to arrive.

In alternative implementations of the transmission scheme 201, a transmitting communication device 100a reserves a first portion of the data mini-slot 204 as a communication initiation acknowledgment mini-slot 206. In such implementations, the communications control processor 106a of the transmitting communication device 100a can selectively add a hail acknowledgement request 209 into the communication initiation message 205. In response to receiving a communication initiation message 205 that includes a hail acknowledgement request 209, the receiving communication device 100b sends an initiation acknowledgment message 211 back to the transmitting communication device 100a during the communication initiation acknowledgment mini-slot 206 using either the hail radio 102b or the data radio 104b. The transmitting communication device 100a waits to power up its data radio 104a until it receives the initiation acknowledgement message 211. Upon receipt, the transmitting communication device 100a proceeds with transmitting a data message 207. If the transmitting communication device 100a does not receive the requested initiation acknowledgement message 211, the transmitting communication device 100a powers down both radios 102a and 104a and waits for the next time slot 201 in which the intended recipient of the data message is scheduled to be awake.

According to another feature, the timing scheme 200 of the invention includes a data acknowledgement mini-slot 208. In implementations employing the data acknowledgment mini-slot 208, in response to receiving a communication initiation message 205 and also an expected data message 207, the receiving communication device 100b informs the transmitting communication device 100a of the successful receipt by sending a data acknowledgement message 213 during the data acknowledgment mini-slot 208. According to some implementations, a receiving communication device 100b only transmits a data acknowledgement message 213 if requested in the data 207 or initiation message 205.

Not receiving an expected acknowledgement message 213 prompts the transmitting communication device 100a to resend the data message 207 at a later time. In response to not receiving an expected data message 207, the receiving communication device 100b sends out a data receipt failure message 215 during the data acknowledgement mini-slot 208. The receiving communication device 100b may also send a data receipt failure message 215 back to a sending communication device 100a for other reasons, such as based on indications that a subsequent destination of a message is not reachable by the receiving communication device 100b. According to some illustrative embodiments, the data receipt failure message 215 includes an error code describing the reason for its transmission.

According to the illustrative embodiment, the communication initiation message 205 has the following format: transmitting communication device 100a address (12 bits), receiving communication device 100b address (12 bits), code rate request (2 bits), initiation acknowledgement request (1 bit) and 5 padding bits (total length of 32 bits). The communication device's 100a address can be useful, and in some instances needed. For example, if multiple hails arrive at a receiving communication device 100b from multiple transmitting communication devices 100a at the same time, the receiving communication device 100b sends an initiation acknowledgement message 205 to one of the transmitting communication devices 100a, indicating which transmitting communication device 100a gets to send. To do so, the receiving communication device 100b needs the address of the transmitting communication device 100a. In very low duty-cycle systems, the likelihood of receiving multiple communication initiations requests may become so low that the transmitting communication device 100a address can be omitted. In alternative embodiments, the receiving communication device 100b can receive multiple data messages from multiple transmitting communication devices 100a in a single time slot 201. The communication devices 100 employ a frequency division multiplexing scheme, a code division multiplexing scheme, or a data mini-slot 204 time division scheme to allow the multi-node, single time slot 201 communication. In such embodiments, the transmitting communication device 100a address is used to differentiate between incoming transmissions.

The receiving communication device 100b address indicates the intended destination of the communication initiation message 205. The above-mentioned code rate request data field indicates the encoding rate with which the transmitting communication device 100a intends to transmit the subsequent data message. The above-mentioned initiation acknowledgement request bit indicates whether an initiation acknowledgement message is requested.

In low duty-cycle environments, a transmitting communication device 100a transmits the communication initiation message 205 at a set of H frequencies, where H is a small value such as 5. The multiple frequency repetition increases the likelihood that the communication initiation message 205 will be received even in the presence of frequency selective fading.

The receiving communication device 100b uses the following format for initiation acknowledgment messages 209: receiving communication device 100a address (12 bits), transmitting communication device 100a address (12 bits), a code rate (2 bits), and a power level modification (4 bits). The receiving communication device 100b address indicates the address of the sender of the communication initiation message 205. The transmitting communication device 100a address corresponds to the address of the transmitting communication device 100a that sent the communication initiation message 205. The code rate field confirms an encoding rate for the expected data message 207. The power level modification data field describes the amount of excess power received by the receiving communication device 100b, and therefore, the amount of power by which the transmitting communication device 100a can decrease its data transmission (given an appropriate modification for the different modulation scheme and datarate). This reduction in power is also used to determine the power used for transmitting the initiation acknowledgement message 209. In the embodiment described above in which a receiving communication device 100b receives data messages 207 from multiple transmitting communication devices 100a during a single time slot, the initiation activation message 211 includes a field indicating the number of and addresses for each the transmitting communication devices 100a that are allowed to transmit during the data mini-slot 204 of the time slot 201.

The data message 207 includes a header with the following format: want-data-acknowledgement (1 bit), more-data (1 bit), ToS (2 bits), final destination of the data (12 bits), and original source (12 bits). The want-data-acknowledgement bit indicates whether the sender is requesting an acknowledgement of the data message 207. The final destination and original source indicate the addresses of the final intended destination and the initial sender, respectively, of the data message 207. The ToS data field includes standard quality of service parameters typically used in wireless networking, including priority levels or IP type of service parameters.

The more-data bit indicates whether further data is queued up to be transmitted from the sender to the recipient, for example, if a complete data message 207 is too long for a single data mini-slot 204. In some implementations, during periods of very low network traffic, to avoid the problem of needing to divide traffic over many time slots 201, which may be of limited number and space far apart, a transmitting communication device 100a sets the more-data bit. In response to receiving a data message 207 in which the more-data bit is set, the receiving communication device 100 keeps its data radio 104 awake during the subsequent time slot 201, even if the receiving communications device 100b is not scheduled to be awake during that time slot 201. During periods of high traffic load, the use of the more-data bit can decrease fairness and throughput over the network. Therefore, the communication devices 100a and 100b limit use of the more-data bit to network environments in which the average local traffic load is less than a measured threshold. The communication devices 100a and 100b determine a local traffic measure by averaging the utilization metrics of neighboring communication devices.

A data acknowledgement message 213 has the following format: receiving communication device 100b address (12 bits), transmitting communication device addresses (12 bits) and a data acknowledgement code (4 bits). The receiving communication device 100b address field refers to the sender of the data acknowledgement message. The transmitting communication device 100a address field refers to the communication device 100a that sent the data packet to the receiving communication device 100b. The acknowledgement code field includes a code indicating whether the data message 107 was successfully received. The message can alternatively include a number and list of transmitting communication devices 100a being acknowledged if applicable. It should be noted that other message formats and frequency usages may be employed in alternative implementations without departing from the scope of the invention.

Figure 3:
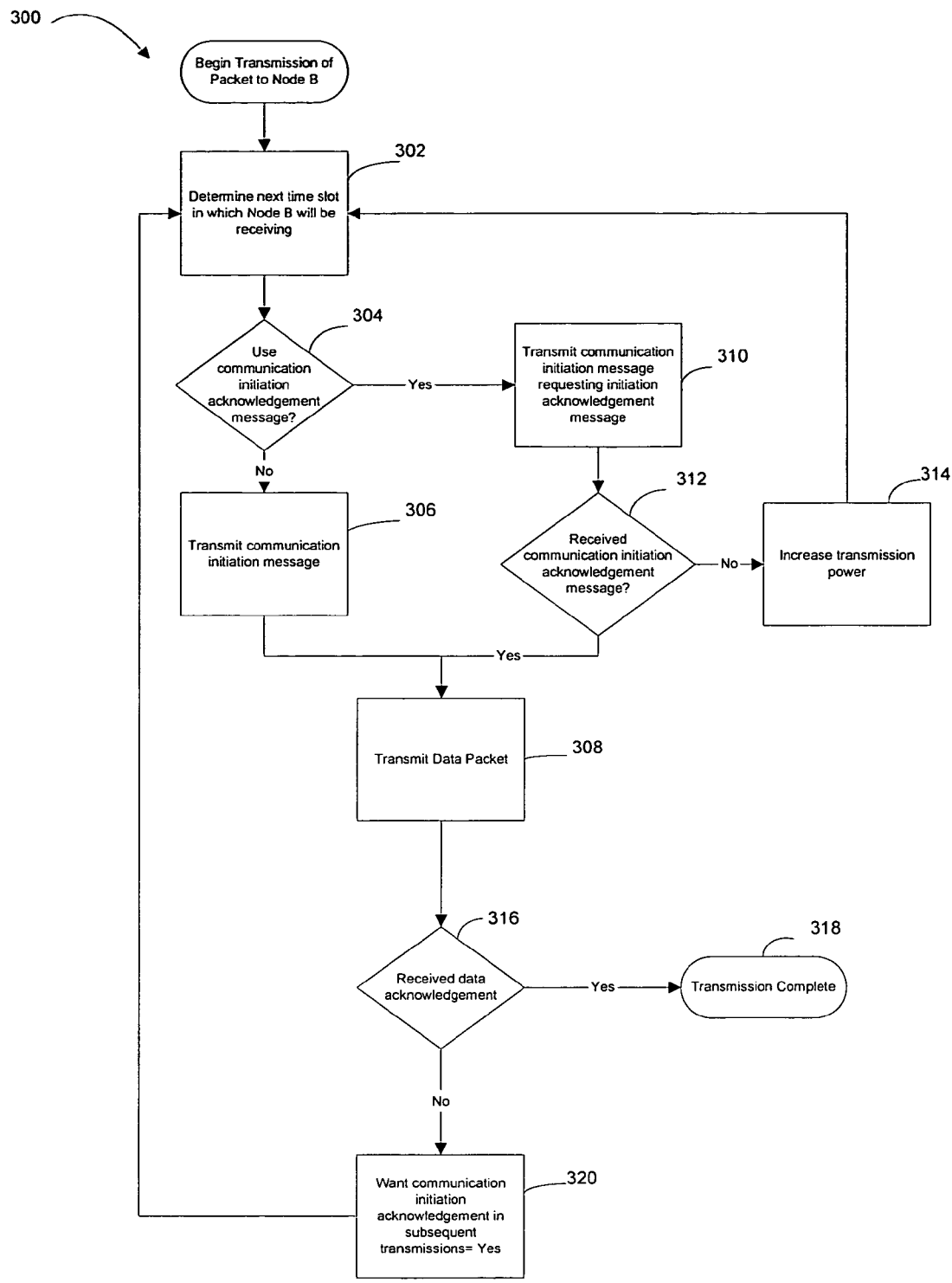
FIG. 3 is a flow chart of a method for transmitting data from a first communication device, such as that depicted in FIG. 1, to a second communication device according to an illustrated embodiment of the invention.

FIG. 3 is a flow chart depicting a method for transmitting a data message from a communication device 100a to a communication device 100b, based on the illustrative time allocation scheme 200. Referring to FIGS. 1-3, initially, the communication device 100a calculates the next time slot 201 in which communication device 100b is scheduled to be available to receive a data packet (step 302). The communication device 100a then remains powered down until this scheduled time slot 201, though the communication device 100a may power up before the scheduled time slot 201 to send or receive packets to or from other communication devices. Illustrative approaches to calculating time slot 201 availability for any particular device are described below with respect to FIG. 5.

At step 304 the communication device 100a branches either to step 306 to transmit the communication initiation message 205 without an acknowledgement request 211 or to step 310 to transmit the communication initiation message 205 with an acknowledgement request 211. Requesting an initiation acknowledgment message 211 uses more transmission time and energy than not requesting one. Requesting an initiation acknowledgement message 211 also cuts into the data mini-slot 204 of the time slot 201, resulting in the transmission of less data in the time slot 201. On the other hand, transmitting a data message 207 to a recipient that fails to receive it (the probability of which is reduced by requiring an initiation acknowledgment message 211 before transmission) wastes energy resources. In some illustrative embodiments, the communication device 100a requests an initiation acknowledgement 211, for example, if the transmission is a retransmission of a previously failed transmission of a data message 207; there is known movement or network change occurring in the network; more than a particular amount of time has passed since the communication device 100a has received a packet from the communication device 100b; and/or the communication control processor 106 predicts a higher than usual error probability for the transmission.

At step 306, the communication device 100a transmits a communication initiation message 205 to the communication device 100b during the hail mini-slot 202 of the scheduled time slot 201 using its hail radio 102a. The communication device 100a then powers up its data radio 104a and powers down its hail radio 102a, and transmits a data message 207 to the communication device 100b at step 308 using the data radio 104a during the data mini-slot 204 of the scheduled time slot 201.

At step 312, the communication device 100a transmits, using its hail radio 102a, a communication initiation message 205 including an initiation acknowledgement request 209 (e.g., the initiation acknowledgement bit of the communication initiation message is set to 1) during the hail mini-slot 202. The communication device 100a awaits receipt of an initiation acknowledgement message 211 (step 312) during the communication initiation acknowledgement mini-slot 206. If communication device 100a does not receive an initiation acknowledgement message 211, it determines the next time slot 201 in which the communication device 100b is expected to be available to receive a data packet (step 302). The communication device 100a may also increase the power used to transmit subsequent communication initiation messages 205 to the communication device 100b (step 314). If the communication device 100a receives an initiation acknowledgement message 211, it powers down its hail radio 102a, powers-up its data radio 104b, and transmits a data message 207 to the communication device 100b (step 308) using the data radio 104b during the data mini-slot 204. The data message 207 is sent at the code rate and power determined in the communication initiation message 205 and/or initiation acknowledgement message 211.

After completing transmission of the data message 207 in either scenario (i.e., with or without an initiation acknowledgement request 209), the communication device 100a awaits receipt of a data acknowledgment message 213 from the communication device 100b (step 316) during the data acknowledgement mini-slot 208. If the communication device 100a receives a data acknowledgement message 213, transmission of the data message 207 is considered to be complete (step 318), and the communication device 100a powers down its data radio 104a. If the communication device 100a does not receive a data acknowledgement message 213, or if it receives a data receipt failure message 215, it determines the next time slot 201 in which the communication device 100b is expected to be available to receive messages. The communication device 100a powers down its data radio 104a and waits until the determined time slot 201 (step 302) to attempt retransmission. Alternatively, the communication device 100a may wait an additional number of time-slots before retrying transmission to communication device 100b. In response to the communication device 100a not receiving a data acknowledgement message 213, or receiving a data receipt failure message 215, it may determine that subsequent communication initiation messages 205 will include initiation acknowledgement requests 209 (step 320).

Figure 4:
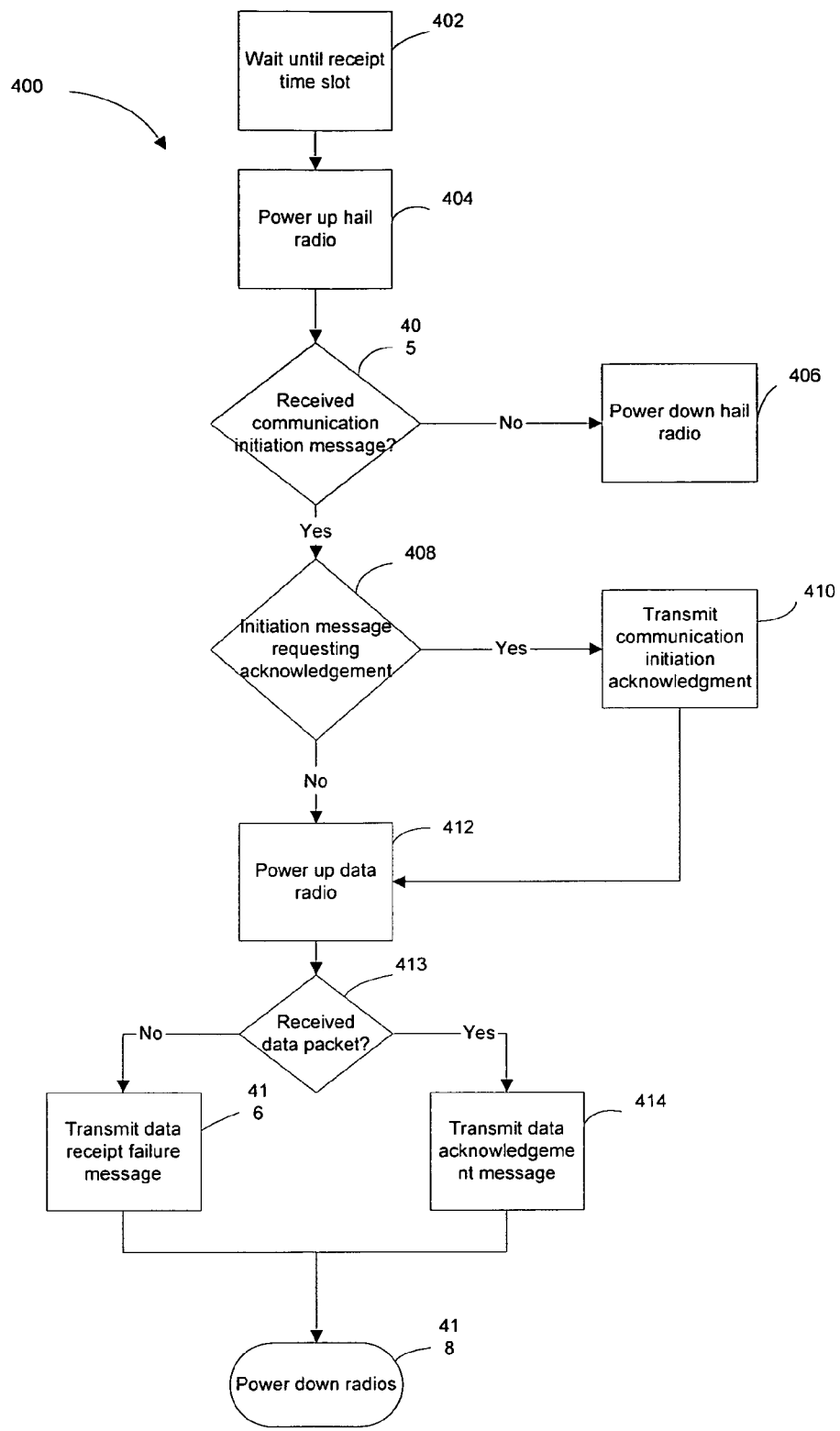
FIG. 4 is a flow chart of a method for receiving data at a first communication device, such as that depicted in FIG. 1, from a second communication device according to an illustrated embodiment of the invention.

FIG. 4 is a flow chart depicting an illustrative process by which the communication device 100b receives a data packet from the communication device 100a. To receive a data message 207, the communication device 100b waits until a time slot in which it is scheduled to wake up for receiving messages (step 402). At the scheduled wake up time, it powers up its hail radio 102b (Step 404) and awaits receipt of a communication initiation message 205 during the hail mini-slot 202. If the communication device 100b does not receive a communication initiation message 205 during the hail mini-slot 302, it powers down its hail radio 102 for the remainder of the time slot 201 (step 406).

If the communication device 100b receives a communication initiation message 205 during the hail mini-slot 202, it analyzes the communication initiation message 205 to determine whether an initiation acknowledgement message 211 is requested (step 408). If the communication initiation message 205 requests an initiation acknowledgement 211, it sends one to the communication device 100a during the communication initiation acknowledgement mini-slot 206 (step 410). Communication device 100b then powers up its data radio 104b and awaits receipt of a data message 207 (step 412) during the data mini-slot 204. If the communication device 100b successfully receives a data message 207 from the communication device 100a, it acknowledges receipt of the data message 207 during the data acknowledgement mini-slot 208 (step 414) by sending a data acknowledgement message 213. If the data mini-slot 204 ends without the communication device 100b successfully receiving a data message 207 from the communication device 100a, it transmits a data receipt failure message 215 (step 416). The communication device 100b then powers down its data radio 104 (step 418). In an alternative implementation, if the communication device 100b fails to receive successfully a data message 213, it keeps its radios 102b and 104b powered up for the subsequent time slot 201 to await retransmission.

As mentioned above with regard to FIG. 1, in addition to controlling the transmission scheme within the time slot 201 described above, the communication control processor 106 also determines in which time slot 201 a particular communication device 100 will be available to receive unicast and multicast messages, determines in which time slot 201 the communication device 100 will be available to broadcast or multicast messages, and predicts in which time slots other communication devices 100 will wake up to receive unicast messages.

According to the illustrative embodiment, the scheduling process includes a threshold analysis, taking into account the output of a shared pseudorandom number generator. Based on an initial seed value, the shared pseudorandom number generator outputs a predictable series of discrete values. The position of a discrete value in the series is referred to as the cycle state. For example, the output of the pseudorandom generator with a seed value of X and a cycle state of 5 refers to the fifth value output by the pseudorandom generator seeded with value X. The cycle state increments at the completion of a time slot. In general, a pseudorandom number generator output corresponding to a particular time slot 201 that falls below a given threshold indicates a wakeup of a communication device 100 during that time slot 201. In alternate implementations, the communication devices 100 have different pseudorandom number generators, but the communication devices 100 have knowledge of the dynamics of the pseudorandom number generators of their neighbors. For illustrative purposes only, it is assumed hereafter that communication devices 100 in a network share a common pseudo-random number generator.

More particularly, to determine a wake-up schedule for itself, and to predict a wake up schedule for its neighbors, a communications device 100 stores a number of variables including unicast and multicast availability thresholds, seed values, and cycle states (collectively referred to as "scheduling data") for itself and for one or more neighbors of the communication device 100. The availability thresholds range between 0 and 1.0. A communication device 100, when entering a network, is assigned a unique seed value which serves as an identifier for the communication device 100. Alternatively, the seed value is hardwired into the communication device 100. The communication device 100 stores multiple assigned/hardwired seed values for generating different pseudorandom numbers. For example, the communication device 100 may use a first seed value for generating pseudorandom numbers for unicast scheduling and a second seed value for generating pseudorandom numbers for multicast scheduling.

The seed values, cycle states, and thresholds of corresponding communication devices 100 are propagated through a network using heartbeat messages. This active heartbeat process also works to maintain up-to-date routing and link state tables, and can be used, in some implementations, to synchronize communication device clocks. In alternative embodiments, communication devices include the seed value, cycle state, and threshold information in the headers of other messages to propagate information with less delay. Heartbeat messages can be transmitted through the system as any other data message 207.

Figure 5:
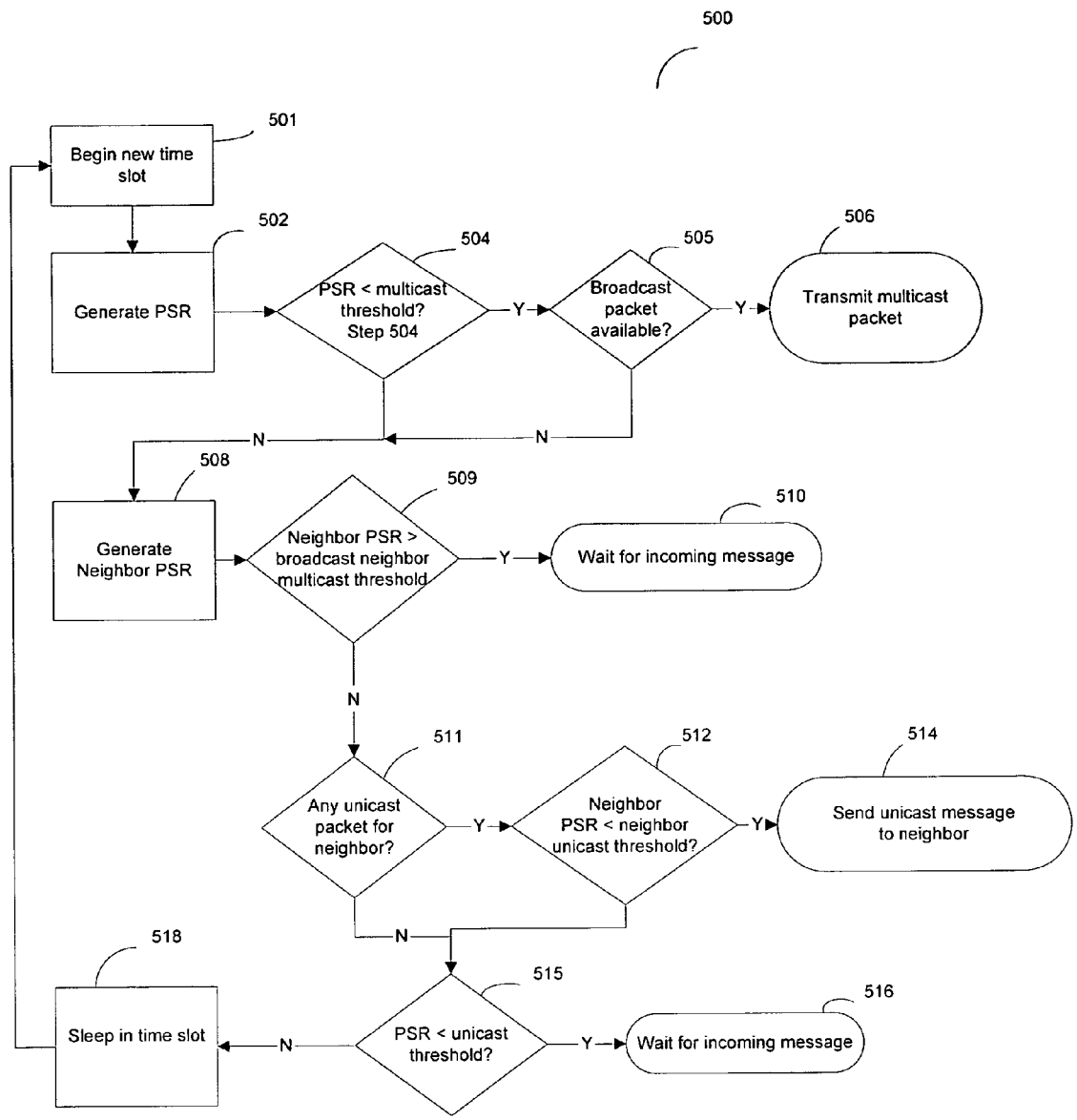
FIG. 5 is a flow chart of a method for scheduling communications between communication devices, such as those depicted in FIG. 1, configured for reduced energy communication according to an illustrative embodiment of the invention.

FIG. 5 is a flow chart of a method for communication scheduling 500 using pseudorandom number generation according to an illustrative embodiment of the invention. In this scheduling method 500, a communication device 100 prioritizes communication in the following order: multicast transmission, multicast receipt, unicast transmission, and unicast reception. Thus, for example, if the communication device 100 is available both for multicast transmission and unicast reception, the communication device 100 will choose to transmit a multicast transmission as multicast transmissions have a higher priority. A communication device 100 may employ other prioritizations, without exceeding the scope of the invention.

A period of time includes multiple time slots $201_0$, $201_1 \ldots 201_t \ldots 201_n$, where t is the cycle state, at the beginning of time slot $201_t$, a communication device 100 determines the next pseudorandom number ("PSR") for itself using its corresponding stored seed value and cycle state t (step 502). If the pseudorandom number generator provides a periodic output, the PSR may be obtained with by inputting t modulo the period of the output.

Based on the prioritization scheme listed above, the communication device 100 first determines whether the time slot $201_t$ should be used for transmitting a multicast transmission. To do so, it compares its corresponding multicast threshold with the PSR for the time slot $201_t$ (step 504). If the PSR falls below the multicast threshold, the communication device 100 transmits (step 506) a multicast packet (e.g., a heartbeat message), if one is queued for transmission (step 505).

If the PSR exceeds the multicast threshold (step 504), or if the communication device 100 does not have a multicast packet to send (step 505), the communication device 100 determines whether it should await a multicast transmission from one or more of its neighbors. To this end, the communication device 100 determines pseudorandom numbers for its known neighbors (step 508) for time slot $201_t$. This determination is based on the seed values, cycle states, and multicast thresholds received in heartbeat messages transmitted by the corresponding neighbors. If the PSR for a neighbor falls below that neighbor's corresponding multicast threshold (step 509), the communication device 100 wakes up and waits for an incoming communication (step 510).

In a scenario in which the communication device 100 determines that it is not transmitting a multicast or broadcast message and that its neighbors are not scheduled to multicast any data packets (step 509), the communication device 100 determines at step 511 whether it has any unicast data packets to send to its neighbors. If the communication device has a packet to send to a neighbor, the communication device at step 512 compares the PSR generated in step 508 for the recipient neighbor to that neighbor's unicast threshold. If the neighbor's PSR falls below the neighbor's unicast threshold, the communication device assumes the neighbor is available for receiving unicast communications. The communication device 100 at step 514 then transmits the unicast data packet to the neighbor using the transmission method described above in relation to FIG. 3. If the communication device 100 has unicast packets queued for multiple neighbors (step 512), the communication device 100 may transmit packets to more than one neighbor, assuming each corresponding neighbor is predicted to be awake based on its corresponding seed value, cycle state, and unicast threshold.

In the case where the communication device 100 determines that it has no messages to send, and no potential multicast messages to receive, it then determines at step 515 whether it should be available for receiving unicast messages. If the PSR of the communication device 100 falls below the unicast threshold of the communication device 100, the communication device 100 awaits incoming unicast messages (step 516). If the PSR exceeds the unicast threshold, the communication device 100 sleeps until the next time slot, $201_{t+1}$ (step 518).

According to another feature of the invention, to take into account a time varying network environment, the communication device 100 dynamically alters its unicast and multicast thresholds. For example, in a network environment that is rapidly changing, the communication device 100 benefits from frequent updates related to changes in the network topology. Multiple communication devices 100 on the network propagate topological information primarily using broadcast or multicast messages. Thus, in times of high network topology flux, each communication device 100 sets its multicast threshold to 1.0 so that it transmits and receives multicast messages whenever possible. Likewise, in stable network environments with little data traffic, each communication device 100 wastes energy by staying awake in more time slots than needed. Thus, in such environments, it decreases one or more of its thresholds. Preferably, each communication device 100 sets a threshold that balances the competing goals of energy conservation and efficient data throughput.

In one implementation, the communication device 100 maintains its unicast and multicast thresholds between a lower bound, for example, 0.1, and 1.0. According to one illustrative embodiment, a communication device 100 raises its thresholds faster than it decreases the threshold. For example, if the communication device 100 determines that a threshold should be raised, it may raise the threshold directly to a maximum value. Alternatively, if the communication device 100 determines that a threshold should be lowered, it may lower the threshold by a relatively small value, e.g., 0.1. In another embodiment, it may lower the threshold by multiplying the threshold by a real number between 0 and 1. In either case, the threshold is not lowered below the lower bound set for the particular threshold. Upon a communication device 100 determining to change one or more of its thresholds, it continues to operate using the former threshold until it transmits updated scheduling information to its neighbors.

To evaluate whether to alter the unicast or multicast threshold, the communication device 100 analyzes network traffic data and network flux data (e.g., the appearance or disappearance of other communication devices 100 to and from the network). It derives traffic data from one or more of an average of actual traffic history over a window of time slots, traffic output predictions from applications operating on the communication device 100, percentage of allocated time slots actually used, and minimum and maximum traffic history maintained by the communication device 100.

It derives network topology flux data from heartbeat and link state messages transmitted by other communication devices. Topology flux data may also be derived from data packet headers. A number of network topology change detections may prompt a communication device 100 to increase one or more of its thresholds to a maximum value, including, without limitation, communication device startup, detection of a new neighbor, an indication in a neighbor's heartbeat message indicating a new second hop neighbor, or a determination that a link state has changed within a predetermined number of hops of the communication device. After a predetermined number of time slots have passed without change in the network topology, the communication device 100 lowers the previously increased threshold.

In an alternative implementation, the communication device 100 provides alternative operating modes depending on the current network environment. For example, in one alternative operating mode particularly suited for high traffic network environments, each of a plurality of communication devices 100 transmit scheduling data corresponding to their neighbors in addition to their own scheduling data in heartbeat or other messages. According to one feature, each communication device 100 can determine from the scheduling data the pseudorandom numbers output and used by other communication devices 100 within a two-hop radius. In this operating mode, a communication device 100 stays silent in any time slot in which it predicts (based on the transmitted scheduling data) another communication device 100 within a two-hop radius will be transmitting a broadcast packet. In still other embodiments, communication devices 100 transmit scheduling data for all nodes within three or four hops. In such embodiments, the communication devices 100 and schedule their data transmissions based on the scheduling data corresponding to all nodes within the increased radius.

Additionally, for unicast transmissions in the alternative operating mode, each communication device 100 remains on for listening purposes in all time slots. Instead of using the PSR generated for a time slot to determine whether a communication device 100 should listen for messages, the communication device 100 utilizes the PSR to determine whether it should transmit a message. As communication devices 100 can determine the PSRs that neighboring communication devices generate for a given time slot, a particular communication device 100 transmits a message if its PSR is greater than the PSRs generated by its neighbors. The network gains additional benefits from entering this alternative operating mode if most or all communication devices 100 within a two-hop radius of a high traffic node support the alternative operating mode.

In another alternative implementation, the communication device 100 may have a single transceiver, which operates in at least two operational modes; for example, high-power and low-power operating modes. In such embodiments, the communication device 100 operates in a low-power operating mode for handling communication initiation and initiation acknowledgement messages, and uses the high-power mode for other messages.

In another alternative embodiment, the communication device 100 utilizes a single low-power transceiver for all communications. Such devices may be used, for example, for low-cost sensors. To implement the transmission and scheduling scheme in a single transceiver, single mode communication device, the communication device 100 can do away with a separate communication initiation message 205, unless an initiation acknowledgement message 211 is requested. Instead, the header of the data message 207 serves as the communication initiation message 205. A receiving communication device awakes in a given time slot t, listens for a portion of the data slot for a data message 207, decodes the header of the data message 207, and powers down its radio if the header indicates the rest of the data message 207 is not intended for that communication device.

When an initiation acknowledgement message 211 is requested, the transmitting communication device 100a transmits a communication initiation message 205 as a separate packet. The transmitting communication device 100a expects an initiation acknowledgement message 211 in response to the communication initiation message 205 and powers down its radio if it does not receive an initiation acknowledgement message 211. A receiving communication device 100b therefore goes through the process of: waking up at the beginning of the mini-slot 201, listening for data bits, decoding the data bits, determining if the header of the data message 207 indicates that this is just a communication initiation message 205 and there is an initiation acknowledgement message 211 expected. If an acknowledgement is expected, the receiving communication device 100b sends an initiation acknowledgement message 211 back to the transmitting communication device 100a.

Figure 6:
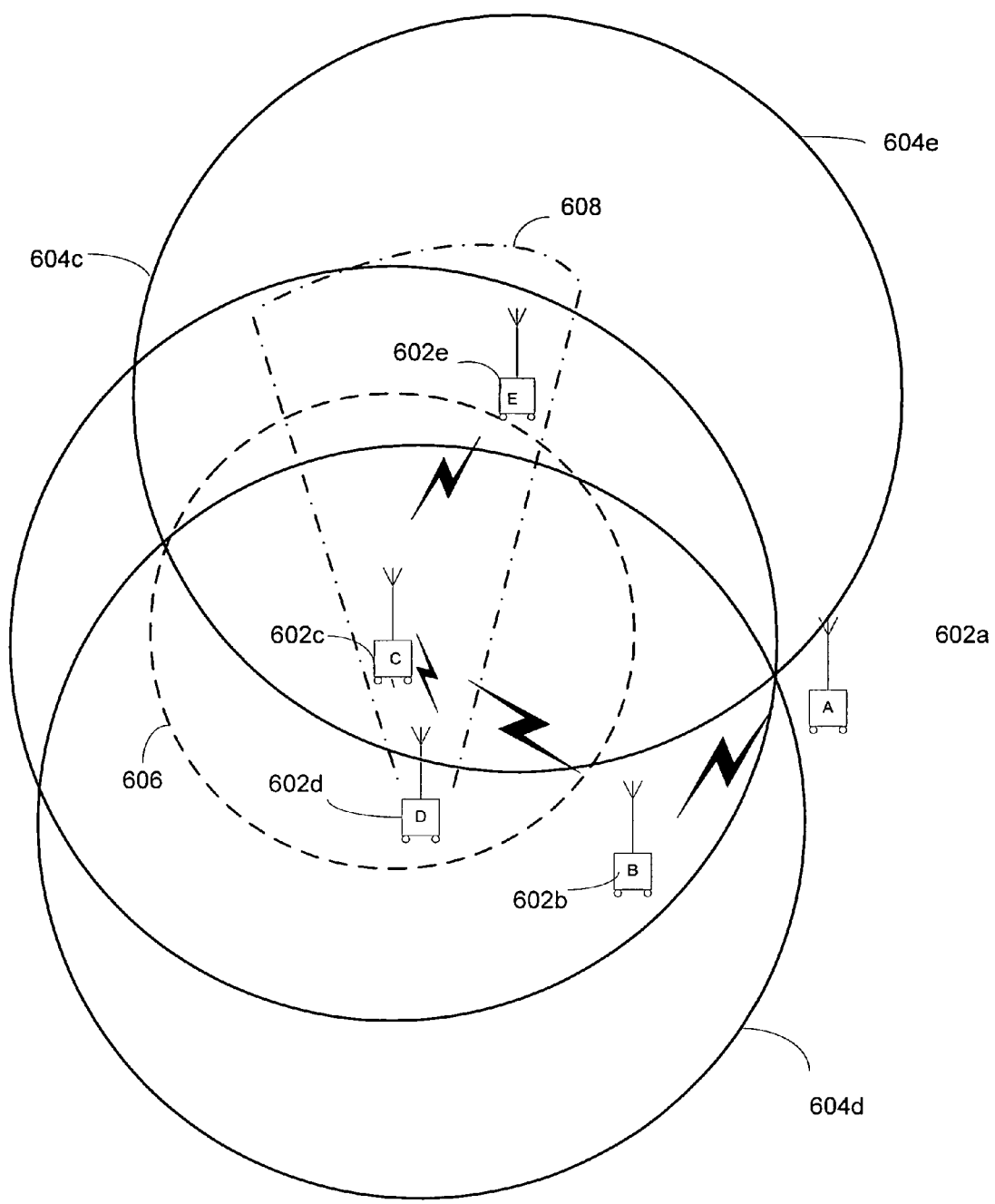
FIG. 6 is a conceptual diagram of a network illustrating methods for reserving communication device bandwidth, according to an illustrative embodiment of the invention.

FIG. 6 is a conceptual diagram of a network 600 of communication devices 602a-602e (generally "communication devices 602"), in which a communication devices 602 using the communication protocol described above may reserve bandwidth to receive transmissions from another communication device 602. Network 600 includes five communication devices 602, i.e., communication devices 602a-602e. The communication devices 602 may be mobile and communicate wirelessly via radio transmissions. Each communication device 602 has a corresponding maximum transmission range 604. FIG. 6 only depicts maximum transmission ranges 604c, 604d, and 604e for communication devices 602c, 602d, and 602e, respectively, for clarity. Optionally, one or more of the communication devices 602, such as communication device 602c, may have the capability to vary the power at which it transmits communications, providing the communication device 602c the option of transmitting with a reduced transmission range 606. In addition, one or more communication devices 602, such as communication device 602d, may have a directional antenna by which it can control the direction of its transmission. Communication device 602d thus can employ a limited-direction transmission range 608.

For some communication applications, for example, the transmission of speech or video, it is desirable for a communication device 602 to be able to guarantee a predetermined level of throughput. Assume communication device 602a requests a guaranteed throughput from communication device 602b of no more than a 40 ms delay. That is, device 602a requests to not have to wait more than 40 ms to be able to transmit a packet to communication device 602b. If there are 50 time slots per second, i.e., each time slot is 20 ms long, then, to meet the throughput request of communication device 602a, communication device 602b has to reserve half of its time slots for receiving packets from communication device 602a. In addition, to maintain the requested throughput, no other communication device 602 can interfere with the ability of communication device 602b to receive communications during the reserved time slots. Thus, during a time slot in which communication device 602 has a time slot reserved for communications device 602a, communication devices 602c and 602d cannot transmit at their maximum transmission ranges 604c and 604d. However, communication device 602c can transmit at a reduced transmission range 606 if the reduced transmission range 606 is short enough not to interfere with messages arriving at communication device 602b. Similarly, communication device 602d can send communications within a limited-direction transmission range 608, as long as communication device 602b does not fall into the limited-direction transmission range 608.

Figure 7:
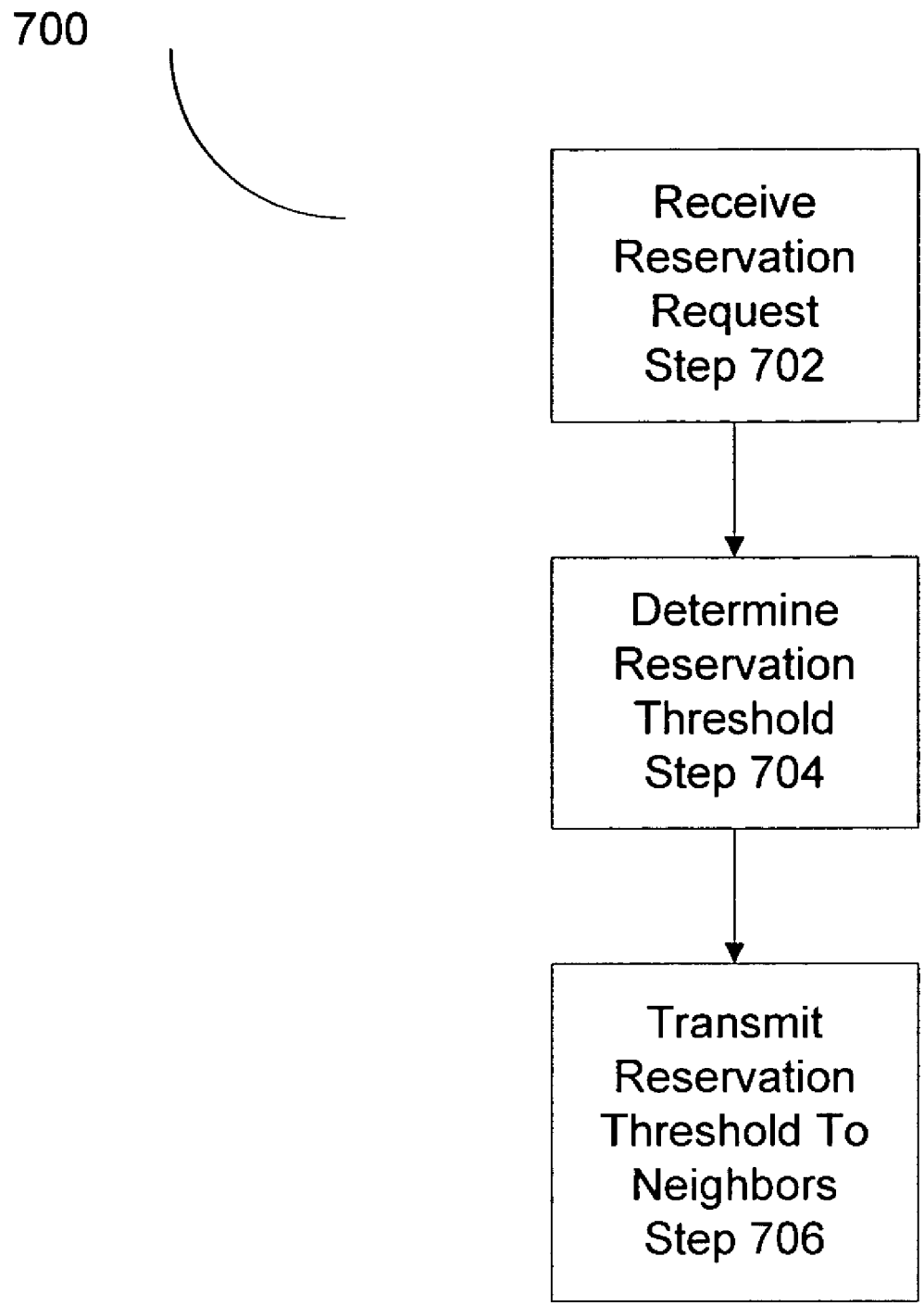
FIG. 7 is a flow chart of a method reserving bandwidth in the network of FIG. 5, according to an illustrative embodiment of the invention.

FIG. 7 is a flow chart of a method of reserving bandwidth in the network 600, according to an illustrative embodiment of the invention. The method 700 begins with a communication device 602, for example, communication device 602b, receiving a request from a neighboring communication device, for example, communication device 602a, to reserve bandwidth for receiving communications from communication device 602a (step 702). Alternatively, the request may include a request to reserve bandwidth for receiving communications from a set of communication devices 602, defined, for example, by a network address mask.

Based on the request, the receiving communication device 602b determines a reservation threshold necessary to meet the throughput request (step 704). In general, communication device 602b implements the reservation request by setting a reservation threshold, similar to the unicast and multicast thresholds described above. During a given time slot, if the pseudorandom generator of the communication device 602b outputs a PSR less than the reservation threshold, it reserves that time slot for receipt of communications from the communication device 602a, the set of communication devices 602 identified in the reservation request. A communication device 602 may set different reservation thresholds for different communication devices 602 or sets of communication devices 602. For example, the communication device 602 can reserve time slots in which its pseudorandom number generator output is less than a first value, e.g., 0.3, for receiving communications from a first communication device 602, and it can reserve time slots in which its pseudorandom number generator output is greater than the first value, but less than a second value, e.g., 0.6 for receiving communications from a second communication device 602. The communication device 602 may optionally set a separate unicast threshold greater than its highest reservation threshold, setting aside time slots during which the communication device 602 can receive messages from any other communication device 602.

Returning to the example, after determining an appropriate reservation threshold (step 704), the receiving communication device 602b broadcasts the reservation threshold to neighboring communication devices 602a, 602c, and 602d (step 706). The reservation threshold can be included in the standard heartbeat message broadcast by the communication device 602b, or it can be included in a separate broadcast message (the "reservation threshold message"). The reservation threshold message includes the reservation threshold value as well as an identifier of the communication device 602 or set of communication devices 602 that correspond to the reservation threshold. The identifier may take the form of, without limitation, an IP address, a MAC address, or a network address mask. If the communication device 602 has set more than one reservation threshold, the reservation threshold message includes each reservation threshold—communication device identifier pairing in series, preferably in order of increasing reservation threshold value.

The receiving node 602b does not need to take any active steps to receive messages from requesting communication device 602a, other than to wake up and await messages in time slots in which the PSR output by the pseudorandom generator of the communication device 602 is less than the reservation threshold set for the requesting communication device 602a.

Figure 8:
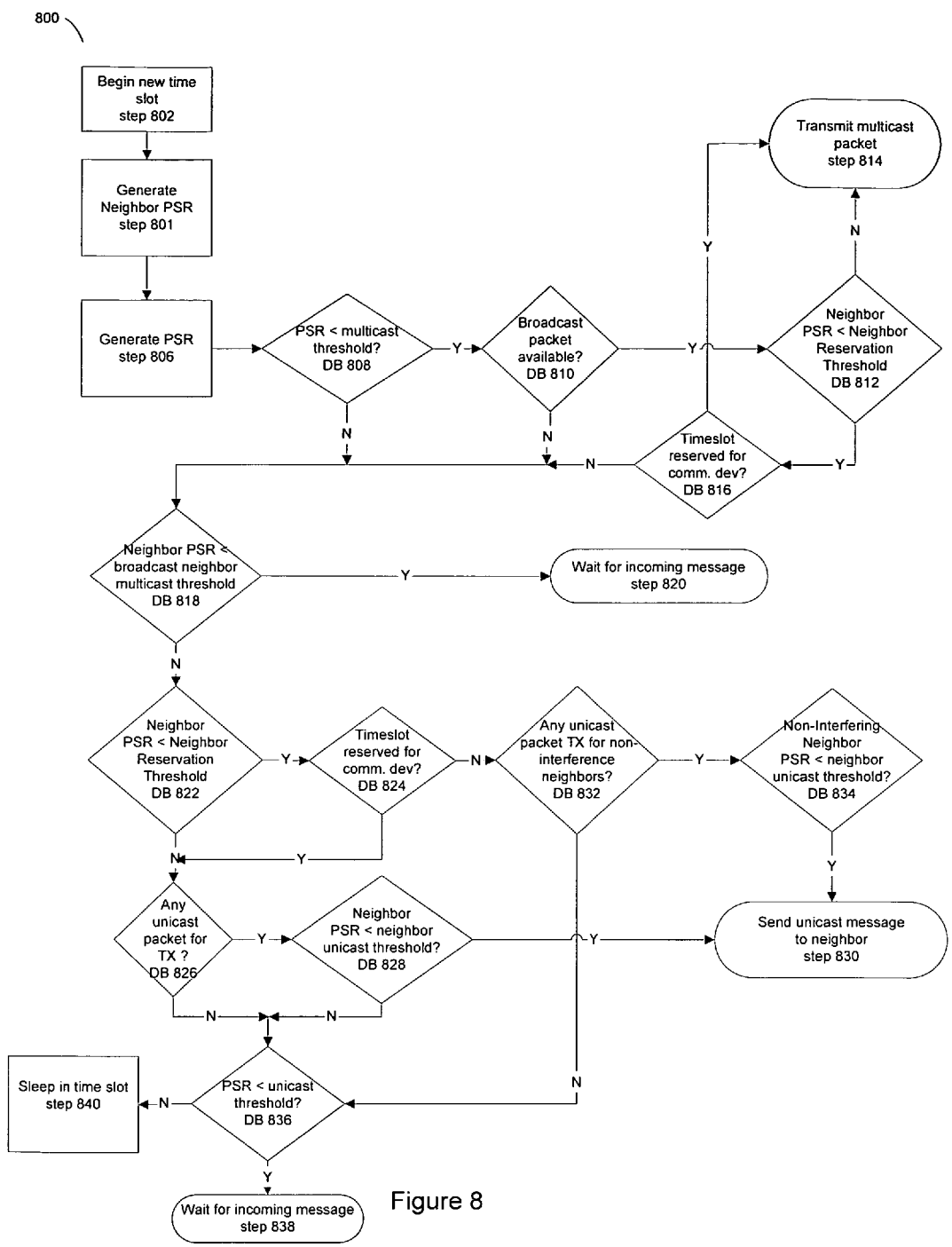
FIG. 8 is a flow chart of a method for scheduling communications between communication devices in a network employing bandwidth reservation, according to an illustrative embodiment of the invention.

Communication devices 602, which neighbor the receiving node 602b, for example, communication devices 602a, 602c, and 602d, upon receiving a reservation threshold message, take care to avoid interfering with the receiving communication device 602b receiving messages during the reserved time slots. FIG. 8 is a flow chart of a method of communicating 800 which respects the bandwidth reservation protocol described above, according to an illustrative embodiment of the invention. As with the method of communication scheduling 500, the method of communicating 800 is based on one illustrative prioritization scheme. Other similar methods can be utilized if other prioritization schemes are desired.

The method 800 begins with the beginning of a new time slot (step 802). At the beginning of the new time slot, a communication device 602 generates PSRs for its known neighbors (step 804) done in step 508 of method 500. The communication device 602 also generates its own PSR (step 806).

After generating the PSR (steps 804 and 806), the communication device 602 determines whether it should transmit or receive a multicast message (decision blocks 808, 810, and 812 and steps 814 and 816). At decision block 808, the communication device 602 determines whether its PSR is less than its multicast threshold. If the PSR is below the multicast threshold, the communication device 602 determines whether it has any broadcast packets to transmit (decision block 810). If the communication device 602 has multicast packets to transmit, the communication device 602 verifies that the time slot is not reserved by any of its neighbors. To do so, it compares the PSR values of its known neighbors with any corresponding reservation thresholds of which the neighbors informed the communication device 602 of (decision block 812). If all neighbors' PSR values exceed their corresponding reservation thresholds, if any, the communication device 602 multicasts its broadcast packet (step 814). If one or more neighbor PSR values falls below the neighbors' corresponding reservation thresholds indicating that a neighbor is reserving the time slot, the communication device 602 determines whether the neighbor is reserving the time slot for the communication device 602 (decision block 816). If the time slot is reserved for the communication device 602, the communication device 602 broadcasts its multicast packet (step 814).

If the communication device 602 did not broadcast a packet at step 814, either because its PSR was greater than its multicast threshold (decision block 808), it did not have a multicast packet to broadcast (decision block 810), or it determined that the time slot was reserved by one of its neighbors (decision block 816), the communication device 602 determines whether it should wait to receive a multicast packet from one of its neighbors. To do so, it compares its neighbors' PSRs with their respective multicast thresholds (decision block 818). If a neighbor's PSR is less than that neighbor's multicast threshold, the communication device 602 waits to receive a broadcast message (step 820). If not, the communication device 602 determines whether it should participate in unicast transmissions, or whether the communication device 602 should sleep for the time slot (step 840).

To determine whether or not to participate in unicast communication, the communication device 602 first compares the PSR values of its neighbors with their respective reservation thresholds (decision block 822). If a neighbor's PSR value is less than its reservation threshold, indicating that the neighbor has the time slot reserved, the communication device 602 determines whether the time slot is reserved for the communication device 602 (decision block 824). If the time slot is reserved by a neighbor for the communication device 602, or if at decision block 822, the communication device 602 determined that all neighbor PSR values exceeded their respective reservation thresholds, if any, the communication device 602 determines whether it has any unicast packets for transmission (decision block 826). If the communication device 602 has unicast packets to transmit, it determines whether the intended recipient will be awake to receive the packet by comparing that recipient's PSR value with the recipient's unicast threshold (decision block 828). Communication devices 602 stay awake to receive packets if their PSR value is less than or equal to their unicast threshold. A communication device's reservation threshold(s) are equal to or are less than their unicast threshold. Thus, if a time slot was determined to be reserved and the intended recipient of the packet is, in fact, the neighbor reserving the time slot, this decision can be skipped. If the communication device 602 determines that the recipient communication device 602 is staying awake to receive a unicast message (decision block 828), the communication device 602 transmits the unicast message (step 830).

If, at decision block 824, the communication device 602 determines that the time slot is reserved for a different communication device 602, the communication device 602 determines whether it has any packets to transmit to neighbors in a fashion that would not interfere with the neighbor reserving the time slot from receiving messages (decision block 832). For example, referring back to the above example in which communication node 602a requested communication device 602b to reserve bandwidth for communications from communication device 602a, assume the current time slot is reserved. If communication device 602d has a unicast packet to transmit to communication device 602c, it can transmit the packet using its directional antenna to transmit with a limited direction transmission range 608 away from communication device 602b. Similarly, if communication device 602c has a unicast packet intended for communication device 602d, communication device 602c can transmit the packet at reduced power, such that the transmission only causes meaningful interference within the reduced transmission range 606. If the communication device 602 can transmit a unicast message without interfering with the neighbor reserving the time slot receiving a communication, the communication device 602 verifies that the intended recipient is staying awake to receive messages (decision block 834). If the recipient is going to be awake, the communication device 602 transmits the packet in a non-interfering fashion (step 830).

If the communication device 602 determines that it should not transmit a unicast message because it has no packets to transmit (decision block 826), the only packets it has to transmit would interfere with a neighbor that has reserved the time slot (decision block 832), or the intended recipient of the communication device 602 is not going to be awake during the time slot (decision blocks 828 and 834), the communication device 602 determines whether it should stay awake to receive a unicast message from a neighbor. It does so by comparing its own PSR with its unicast threshold at decision block 836. If its PSR is less than its unicast threshold, the communication device 602 remains awake to await a unicast message (step 838). If its PSR is greater than its unicast threshold, the communication device 602 shuts down its transceivers for the time slot and sleeps until the next time slot in which it is scheduled to wake up (step 840).

A communication device 602 requesting that bandwidth be reserved can also reserve bandwidth downstream of its one-hop neighbors. For example, communication device 602e may request that 25% of all time slots be reserved for communications between itself and communication device 602d. To do so, communication device 602e transmits a request to reserve time between itself (the "requesting communication device 602"), the end destination communication device 602 (the "destination communication device 602"), along with the bandwidth reservation requirements. Communication devices 602 that receive the request determine whether they are on the shortest path between the requesting communication device 602 and the destination communication device 602. If they are, they set a reservation threshold based on the reservation request, and retransmit the reservation request. If the communication device 602 is not on the shortest path between the requesting communication device 602 and the destination communication device 602, the communication device 602 ignores the request. Alternatively, the requesting communication device can send the packet as an end-to-end packet that gets directed via standard unicast routing techniques. Each communication device 602 along the route sets a corresponding reservation threshold, determines the next communication device 602 in the path, and forwards on the request.

The invention may be embodied in other specific forms without departing from the spirit or essential characteristics thereof. The forgoing embodiments are therefore to be considered in all respects illustrative, rather than limiting of the invention.

What is claimed is:

1. A method of reserving wireless communication bandwidth in an ad hoc network in which nodes are capable of routing data by forwarding data to other nodes in the network, the method comprising:
    transmitting, by a first node to a plurality of receiving nodes, first scheduling data sufficient for a receiving node in the plurality of receiving nodes to predict times at which the first node will be available to receive wireless communications from the plurality of receiving nodes ("receiving times"); and
    transmitting, by the first node to the plurality of receiving nodes, second scheduling data including an identified set of nodes, wherein the second scheduling data is sufficient for the receiving node to predict times reserved for communications from the identified set of nodes to the first node ("reserved times"), during which times:
        (1) the receiving node can transmit to the first node only if the receiving node is in the identified set of nodes, and
        (2) the receiving node can transmit to a node other than the first node only communications with a transmission range that is reduced in distance or limited in direction to reduce interference with wireless communications from the identified set of nodes to the first node;
    thereby reserving times for nodes in the identified set of nodes to communicate with the first node, wherein the first node, the receiving node, and the nodes in the set of nodes share a common algorithm for predicting the receiving times and the reserved times based on the first and second scheduling data;
    powering up a receiver of the first node during the receiving times, such that the first node can receive communications from one of the receiving nodes; and
    fully powering down a receiver of the first node during times other than the receiving times, such that the first node does not receive communications via the receiver.

2. The method of claim 1, wherein the first node is in the set of nodes.

3. The method of claim 1, wherein the set of nodes includes only one node.

4. The method of claim 1, wherein the set of nodes includes a plurality of nodes.

5. The method of claim 4, wherein the set of nodes is defined by a network address mask.

6. The method of claim 1, wherein the common algorithm for predicting the receiving times and the reserved times is a pseudorandom number generator.

7. The method of claim 1, wherein the first scheduling data comprises a first value corresponding to the percentage of time that the first node will be available for receiving wireless communications.

8. The method of claim 7, wherein second scheduling data includes a second value corresponding to a percentage of time which is less than the first value.

9. The method of claim 8, wherein the common algorithm for predicting the receiving times and the reserved times is a pseudorandom number generator.

10. The method of claim 9, wherein the first node is available to receive wireless communications from only the set of nodes if the output of the pseudorandom number generator, using at least a portion of the first or second scheduling data as an input, is less than the second value.

11. The method of claim 9, wherein the first node is available to receive wireless communications from any node if the output of the pseudorandom number generator, using at least a portion of the first or second scheduling data as an input, is greater than the second value but less than the first value.

12. The method of claim 1, comprising:
transmitting by the first node a wireless communication to a third node requesting the third node to reserve bandwidth for receiving wireless communication from the first node.

13. The method of claim 1, comprising:
determining, by the first node, the second scheduling data based on a request to reserve a specified bandwidth for wireless transmission from nodes in the set of nodes.

14. A method of communication over an ad hoc network in which nodes are capable of routing data by forwarding data to other nodes in the network, the method comprising:
receiving at a first node first scheduling data from a second node sufficient for the first node to predict when the second node will be available to receive wireless communications from the first node ("receiving times");
receiving at the first node second scheduling data including an identified set of nodes from the second node, wherein the second scheduling data is sufficient for the first node to determine times reserved for communication from the identified set of nodes to the second node ("reserved times"), during which times:
  (1) the first node can transmit to the second node only if the first node is in the identified set of nodes, and
  (2) the first node can transmit to a node other than the second node only wireless communications with a transmission range that is reduced in distance or limited in direction to reduce interference with wireless communications from the identified set of nodes to the second node, thereby reserving bandwidth of the second node to receive wireless communication from the identified set of nodes;
wherein the first node, the second node, and the nodes in the set of nodes share a common algorithm for predicting the times based on the first and second scheduling data;
transmitting, from the first node to the second node, a data packet during a reserved time determined based on the common algorithm; and
refraining from transmitting, from the first node to the second node, a data packet during times other than reserved times for the first node determined based on the common algorithm.

15. The method of claim 14, wherein the first scheduling data comprises a seed value for a pseudorandom number generator.

16. The method of claim 14, wherein the first scheduling data comprises a cycle state for generating an output from a pseudorandom number generator.

17. The method of claim 14, wherein the second scheduling data comprises a reservation threshold.

18. The method of claim 17, comprising comparing an output from a pseudorandom number generator, based at least in part on the scheduling data, with the reservation threshold.

19. The method of claim 18, comprising, in response to determining that the output of the pseudorandom number generator is less than the reservation threshold, transmitting a data packet from the first node to the second node.

20. The method of claim 18, comprising, in response to determining that the output of the pseudorandom number generator is greater than the reservation threshold, refraining from transmitting a data packet from the first node to the second node.

21. The method of claim 14, comprising transmitting a message at a reduced power level to avoid interfering with the second node receiving communications from a node in the set of nodes.

22. The method of claim 14, comprising transmitting via a directional antenna to avoid interfering with the second node receiving communications from a node in the set of nodes.

23. The method of claim 14, wherein the second scheduling data includes an identifier corresponding to the set of nodes allowed to transmit data packets during reserved time slots.

24. The method of claim 23, wherein the identifier comprises a network address mask.

25. The method of claim 23, wherein the identifier comprises one of a MAC address and an IP address.

26. The method of claim 14, further comprising powering up a receiver of the second node during the predicted times at which the second node will be available to receive wireless communications from the first node, such that the second node can receive communications from the first node.

27. The method of claim 14, further comprising powering down a receiver of the second node during times other than the predicted times at which the second node will be available to receive wireless communications from the first node, such that the second node cannot receive communications from the first node.

* * * * *